C. F. AND K. J. MOYER.
DIRIGIBLE SPOTLIGHT FOR AUTOMOBILES.
APPLICATION FILED DEC. 15, 1920.

1,413,761.

Patented Apr. 25, 1922.

INVENTORS
C. F. MOYER AND
K. J. MOYER.
BY
ATTORNEY.

UNITED STATES PATENT OFFICE.

CLARENCE F. MOYER AND KARL J. MOYER, OF PUEBLO, COLORADO.

DIRIGIBLE SPOTLIGHT FOR AUTOMOBILES.

1,413,761.  Specification of Letters Patent.  Patented Apr. 25, 1922.

Application filed December 15, 1920. Serial No. 430,927.

*To all whom it may concern:*

Be it known that we, CLARENCE F. MOYER and KARL J. MOYER, citizens of the United States, residing at Pueblo, in the county of Pueblo and State of Colorado, have invented certain new and useful Improvements in Dirigible Spotlights for Automobiles, of which the following is a specification.

This invention relates to dirigible spot lights for automobiles, and its main object is to provide in connection with an electric headlight mounted in front of an automobile, a simple and efficient mechanism for turning it in conjunction with the steering gear of the same.

Another object of the invention is to provide in connection with a headlight of the above-described character an automatic switch which normally opens the circuit of the lamp and closes the same only when the steering gear is operated to turn the vehicle in either direction from the straight course.

Still other objects of the invention reside in details of construction all of which will be fully described with reference to the accompanying drawings in which like characters of reference designate corresponding parts throughout the several views.

Figure 1:
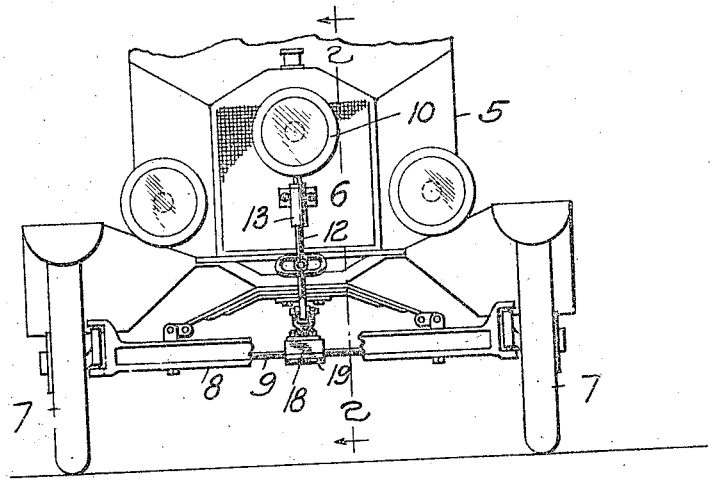
Figure 2:
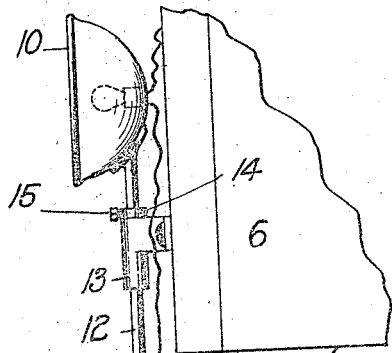
Figure 3:
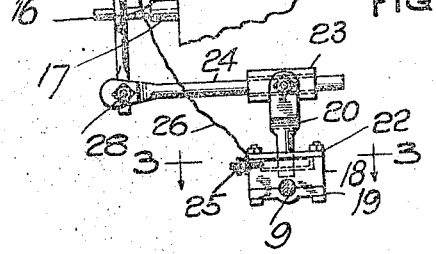

In the drawings Figure 1 represents a front view of a motor vehicle to which our invention is applied;

Figure 2, an enlarged sectional elevation on the line 2—2, Figure 1;

Figure 3, an enlarged section taken on the line 3—3, Figure 2, and

Figure 4:
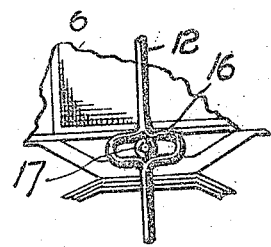

Figure 4, a fragmentary front view of the lamp supporting rod of the invention, and adjacent parts of the motor vehicle to which it is applied.

Referring in detail to the drawings the reference numeral 5 designates a motor vehicle in which are included the radiator 6, the front or steering wheels 7 mounted at opposite ends of an axle 8, and a connecting rod 9 which is pivotally connected at its ends to the knuckle arms of the steering gear.

All of the parts so far mentioned are of well-known construction and arrangement.

Our invention comprises a head lamp 10 of the type commonly known as spot lights which is supported upon a rod 12. The lamp is mounted in front of the radiator of the vehicle by means of a bearing 13 through which its rod extends. The bearing is rigidly secured to the radiator by bolts or other suitable means and the rod is provided with a collar 14 which rests upon the bearing for the support of the lamp.

The collar is fastened to the rod by a set-screw 15 which permits of its adjustment to regulate the elevation of the lamp, and the rod has an annular portion 16 as best shown in Figure 4 of the drawings which gives access to the starter shaft 17 of the motor which projects beneath the radiator of the automobile.

A block composed of two bolt-connected sections 18 and 19 is rigidly clamped upon the connecting rod of the steering gear of the vehicle for the movable support of a forked post 20 of the movement transmitting mechanism by which the longitudinal movements of the connecting rod are converted into a rotary movement of the lamp supporting rod in the bearing 13.

The post is superimposed upon a turntable 21 fitted in a recess of the clamp-block and held against upward movement by a cover plate 22 which is fastened upon the block by the same bolts which connect its sections.

A sleeve 23 pivotally mounted in the fork at the upper end of the post provides a slide-bearing for a crank rod 24 which has a forked head for its connection with the lower end of the lamp supporting rod 12.

The two rods are pivotally connected by means of a bolt 28 to permit of vertical adjustment of the lamp. The turn-table of the post provides a convenient medium for controlling the circuit of the spot light which as usual is equipped with an incandescent lamp, the object of this circuit control being to connect the lamp of the spot light in the circuit only when by movement of the steering gear the vehicle is turned in either direction from a straight course.

The clamp block carries with this object in view an insulated binding screw 25 which is connected with the lamp of the spot light by a conductor 26 and the turn table has in its circumferential edge an inlaid segment 27 of nonconducting material which contacts with the end of the screw when the steering gear is in its central position.

The conductive part of the turn table is connected in the ground side of the circuit by its electrical connection with the metal connecting rod of the steering mechanism of the vehicle. From the above description taken in connection with the drawings, it will be understood that when the vehicle to which our invention is applied is moving in a straight course, the spot light mounted in front of the automobile faces forwardly with its incandescent lamp in an unlighted position.

When for the purpose of turning the vehicle in either direction from the given course, the connecting rod of the steering gear is moved longitudinally, the consequent movement of the clamp block will cause the crank rod 24 to turn with the post 20 and at the same time slide lengthwise in the sleeve 23.

As a result of this movement the spot light is compelled to turn in its bearings in the same direction in which the vehicle is being moved and its lamp is simultaneously lighted by the contact of the conductive portion of the circumferential edge of the turn table with the end of the binding screw.

The spot-light thus illuminates the road at the side of the vehicle in the direction in which the latter is being turned, while the ordinary headlight illuminates the other part of the road, as before.

Having thus described the dirigible spot light construction in the most convenient and practical form at present known to us, it will be understood that it is susceptible to changes in the construction and arrangement of its parts without departing from the principle of the invention.

What we claim and desire to secure by Letters-Patent is:

A dirigible spot light for motor vehicles comprising an electric head lamp, a supporting rod for the lamp, a bearing for the rod, adapted for connection to the vehicle, a block adapted for rigid connection with the connecting rod of the steering gear of the vehicle, a turn table on the block, having a peripheral non-conducting segment, an insulated binding screw on the block engaging the periphery of the turn table and electrically connected with the lamp, a post on the turn table, and a movement transmitting member between the post and the lamp-supporting rod.

In testimony whereof we have affixed our signatures.

CLARENCE F. MOYER.
KARL J. MOYER.